United States Patent [19]
Mabuchi

[11] 3,755,963
[45] Sept. 4, 1973

[54] ACTUATOR FOR A RUDDER OF MODEL PLANE

[75] Inventor: Kenichi Mabuchi, Tokyo, Japan

[73] Assignee: Mabuchi Motor Co., Ltd., Tokyo, Japan

[22] Filed: Dec. 8, 1971

[21] Appl. No.: 205,894

[30] Foreign Application Priority Data
Dec. 8, 1970    Japan ............................ 45/121677

[52] U.S. Cl. ................. 46/244 A, 46/76 R, 244/87
[51] Int. Cl. ...................... A63h 27/02, A63h 33/26
[58] Field of Search .................. 244/87, 83 R, 83 E; 46/244 A, 244 B, 244 R, 243 AV, 76 R; 310/36

[56] References Cited
UNITED STATES PATENTS

| | | | |
|---|---|---|---|
| 2,277,378 | 3/1942 | Wells | 244/87 X |
| 2,671,863 | 3/1954 | Matthews | 310/36 |
| 2,771,572 | 11/1956 | Adams | 310/36 |
| 2,903,822 | 9/1959 | Reid | 46/244 B |
| 3,152,290 | 10/1964 | Cassano et al. | 310/36 X |
| 3,355,838 | 12/1967 | Huffman | 46/244 R X |

*Primary Examiner*—Milton Buchler
*Attorney*—Edward S. Irons, James D. Halsey, Jr. et al.

[57] ABSTRACT

An actuator for a rudder of a model plane comprises a pair of arched yokes opposingly arranged around the periphery of a permanent magnet of disc form. An electromagnet having windings for separately magnetizing each of the yokes is provided. An actuating lever is secured, at its one end, to a shaft of the permanent magnet disc and a rudder of a vertical tail of the model plane is coupled to the other end of the actuating lever through an appropriate link mechanism. By selective energization of the windings of the electromagnet the magnet disc is rotated clockwise or counterclockwise, resulting in corresponding rotation of the rudder.

1 Claim, 1 Drawing Figure

PATENTED SEP 4 1973
3,755,963
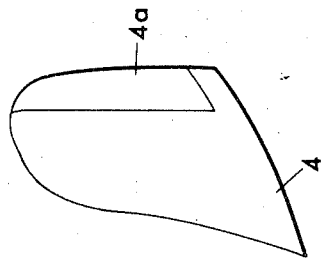
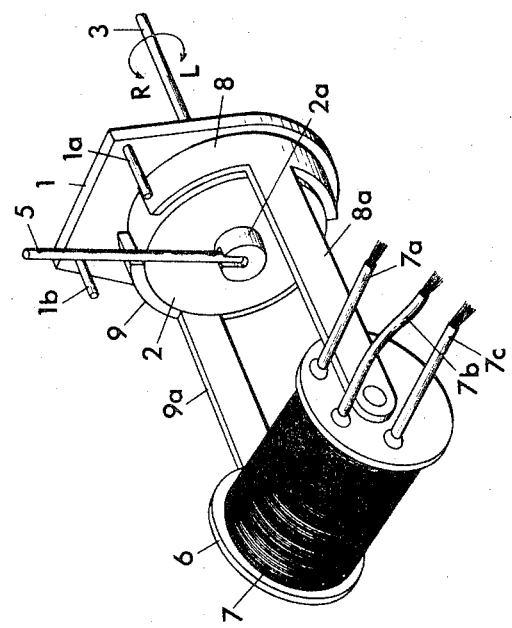

ACTUATOR FOR A RUDDER OF MODEL PLANE

The present invention relates to an actuator for a rudder of a model plane, and more particularly to an actuator for tilting the rudder of a vertical tail of a model plane rightward or leftward through a wireless control means during the flight of the model plane which is adapted to fly by a drive motor such as a miniature electric motor, gasoline engine or the like under wireless control system.

It is an object of the present invention to provide an actuator for a rudder of a model plane, which is simple and compact in structure, light in weight and reliable in operation.

In accordance with the present invention, there is provided an actuator for a rudder of a model plane under wireless control system, comprising a permanent magnet of disc form, a pair of arched yokes opposingly arranged around the periphery of the permanent magnet disc, an electromagnet having windings for separately magnetizing each of said yokes, an actuating lever secured, at its one end, to a shaft of said permanent magnet disc, and a rudder of a vertical tail of the model plane coupled to the other end of said actuating lever through a link mechanism.

A preferred embodiment of the present invention will now be described in more detail with reference to the accompanying drawing, which shows a perspective view of an embodiment of an actuator for a rudder of a model plane according to the present invention.

Referring now to the drawing, there is illustrated one form of an actuator for a rudder of a model plane embodying the present invention.

Numeral 1 represents a board made of non-magnetic materials, numeral 2 a permanent magnet of disc form, numeral 3 an actuating lever, numeral 4 a vertical tail, numeral 4a a rudder and numeral 5 a control lever. The non-magnetic board 1 is appropriately mounted within the body of the model airplane adjacent the tail thereof. At the central portion of the permanent magnet disc 2 a shaft 2a is fixedly secured, which shaft 2a is rotatably fitted to the insulator 1. The actuating lever 3 is operatively connected to the rudder 4a through any conventional linkage mechanism, for example, as illustrated in U. S. Pat. No. 3,699,708. The control lever 5 is fixedly secured to the front end of the shaft 2a and adapted to rotate clockwise or counterclockwise by rotation angle defined by stop elements 1a and 1b protruding from the non-magnetic board 1. The control lever 5 and the actuating lever 3 may be formed integrally with each other.

The bobbin 6 is appropriately mounted within the body of the model airplane in the same manner as the other components thereof, as, for example, as illustrated in U. S. Pat. No. 3,699,708.

An electromagnet is formed of windings 7 and the bobbin 6. Lead wires 7a, 7b and 7c are taken out through one side plate of the bobbin 6.

Yokes 8 and 9 are arranged around the outer periphery of the permanent magnet 2 of disc form, leaving a desired gap therebetween. The yokes 8 and 9 are secured to the opposite side plates of the bobbin 6 through magnetic plates 8a and 9a, respectively.

Within the model airplane is a switching means (not shown) of conventional design well known in the prior art having two contacts connected to the windings of the electromagnet through the lead wires, 7a and 7c, and also a neutral position. A fixed contact of the switching means is connected to the positive terminal of a power source also suitably mounted within the model airplane in conventional manner. The lead wires 7a and 7c are further connected through windings to the lead wire 7b which is in turn connected to a negative terminal of the power source. Said switching means is adapted to operate under a remote control system.

With the arrangement as described above, when the switch is in the neutral position and no current is applied through the electromagnet, the rudder 4a of the vertical tail 4 is held in a predetermined position. When the switch is closed and a current is applied through the lead wires 7a and 7b the actuating lever 3 is rotated to the left, i.e., in the direction indicated by arrow L, by the action of the yoke 8 and the permanent magnet disc 2. Thus, the rudder 4a of the vertical tail 4 is turned to the left. On the other hand, when the switch is closed to apply a current through the lead wires 7c and 7b, the actuating lever 3 is rotated in the opposite direction, i.e., to the right as shown by arrow R.

As described hereinabove, according to the present invention, a pair of arched yokes are opposingly arranged around the periphery of the permanent magnet disc; the permanent magnet disc is caused to rotate clockwise or counterclockwise by the selection of electrical path to the windings; and the actuating lever for actuating the rudder is secured to the shaft of the permanent magnet; thereby to make the actuator of the present invention simple in structure light in weight and positive and reliable in operation, lowering the manufacturing cost, and saving the space to be occupied by the actuator. Thus, the actuator of the present invention is made just suitable for a rudder of a model plane. The reference to Japanese Pat. application No. 106019/70 will be appreciated, the invention of which is an essential basis of a series of my investigations with respect to model airplane to which series of my investigations the present invention belongs.

What is claimed is:

1. In a model airplane provided with a movable rudder, a system for actuating the rudder comprising:
 a non-magnetic board positioned within the model airplane,
 a disc of permanent magnetic material rotatably mounted to said board,
 a pair of arched yokes of magnetizable material positioned around the periphery of said disc and in spaced relationship thereto, the ends of said yokes being disposed adjacent to each other,
 an electromagnet for separately magnetizing each of said yokes,
 an actuating lever connected to said disc to rotate therewith and to be connected to said rudder, and
 means forming a part of said board in the path of rotation of said disc defining the limits of rotation of same.

* * * * *